US009979798B2

(12) United States Patent
Ayanam et al.

(10) Patent No.: US 9,979,798 B2
(45) Date of Patent: May 22, 2018

(54) THIN/ZERO CLIENT PROVISIONING AND MANAGEMENT USING CENTRALIZED MANAGEMENT SOFTWARE

(71) Applicant: AMERICAN MEGATRENDS, INC., Norcross, GA (US)

(72) Inventors: Varadachari Sudan Ayanam, Suwanee, GA (US); Samvinesh Christopher, Suwanee, GA (US); Tommy Hu, Taipei (TW); Blake Yang, Kaihsiung (TW)

(73) Assignee: AMERICAN MEGATRENDS, INC., Norcross, GA (US)

( * ) Notice: Subject to any disclaimer, the term of this patent is extended or adjusted under 35 U.S.C. 154(b) by 299 days.

(21) Appl. No.: 14/146,611

(22) Filed: Jan. 2, 2014

(65) Prior Publication Data
US 2015/0188992 A1 Jul. 2, 2015

(51) Int. Cl.
*G06F 15/16* (2006.01)
*H04L 29/06* (2006.01)
*H04L 29/08* (2006.01)
*H04L 12/24* (2006.01)

(52) U.S. Cl.
CPC ............. *H04L 67/42* (2013.01); *G06F 9/452* (2018.02); *H04L 41/04* (2013.01); *H04L 41/0809* (2013.01); *H04L 67/125* (2013.01); *H04L 67/16* (2013.01); *H04L 41/5096* (2013.01)

(58) Field of Classification Search
CPC ................................ H04L 67/42; H04L 67/10
USPC ........................................................ 709/203
See application file for complete search history.

(56) References Cited

U.S. PATENT DOCUMENTS

| 8,712,631 | B2* | 4/2014 | Tietjen | H04L 63/10 |
| | | | | 701/31.5 |
| 2002/0174010 | A1* | 11/2002 | Rice, III | G06F 17/30194 |
| | | | | 705/14.67 |
| 2003/0014476 | A1* | 1/2003 | Peterson | G06F 9/4416 |
| | | | | 709/203 |
| 2005/0235280 | A1* | 10/2005 | Le | G06F 8/65 |
| | | | | 717/173 |

(Continued)

*Primary Examiner* — Kevin Bates
*Assistant Examiner* — Golam Mahmud
(74) *Attorney, Agent, or Firm* — Locke Lord LLP; Tim Tingkang Xia, Esq.

(57) ABSTRACT

Present disclosure relates to a desktop cloud manager configured to manage thin client computers. The desktop cloud manager includes: XMS server processor, XMS communication interface for communicating between desktop cloud manager and thin client computers, thin client computer database for storing thin client computers and peripherals information; and non-volatile memory storing an XMS server operating system, and firmware having thin client management software. When executed by XMS server processor, thin client management software firmware performs one or more of following operations: (a) connecting to thin client computers through a cloud, (b) discovering thin client computers using UPnP protocol, (c) registering thin client computers at thin client computer database, (d) detecting management modes of thin client computers, (e) provisioning functionalities of thin client computers according to management modes, (f) configuring device settings of the peripherals attached to thin client computers, and (g) managing and controlling thin client computers connected through cloud.

25 Claims, 4 Drawing Sheets

(56) References Cited

U.S. PATENT DOCUMENTS

| | | | |
|---|---|---|---|
| 2007/0008973 A1* | 1/2007 | Galea | G06F 9/4416 370/392 |
| 2007/0220122 A1* | 9/2007 | Brown | H04L 41/0213 709/220 |
| 2008/0120539 A1* | 5/2008 | Stephens, Jr. | G06F 17/24 715/256 |
| 2008/0183841 A1* | 7/2008 | Isokawa | H04L 63/10 709/217 |
| 2008/0204798 A1* | 8/2008 | Taniguchi | G06F 3/1204 358/1.15 |
| 2010/0115020 A1* | 5/2010 | Hochmuth | G06F 3/1423 709/203 |
| 2011/0046754 A1* | 2/2011 | Bromley | G05B 19/41885 700/83 |
| 2011/0231680 A1* | 9/2011 | Padmanabhan | G06F 1/3209 713/310 |
| 2012/0239740 A1* | 9/2012 | Sartori | H04N 21/4122 709/203 |
| 2013/0060842 A1* | 3/2013 | Grossman | H04L 12/4641 709/203 |
| 2013/0074165 A1* | 3/2013 | Dhaene | G06F 21/34 726/5 |
| 2013/0304810 A1* | 11/2013 | Tukol | G06F 9/44505 709/203 |
| 2014/0082052 A1* | 3/2014 | Kwon | H04L 67/08 709/203 |
| 2014/0324944 A1* | 10/2014 | Christopher | H04L 67/025 709/203 |

\* cited by examiner

THIN/ZERO CLIENT PROVISIONING AND MANAGEMENT USING CENTRALIZED MANAGEMENT SOFTWARE

FIELD

The present disclosure relates generally to management of thin client/zero client computer systems, and particularly to method and apparatus for thin/zero client provisioning and management using centralized management software.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A thin client (sometimes also called a lean or slim client) is a low-cost, centrally-managed computer devoid of CD-ROM players, diskette drives, and expansion slots, a computer or a computer program which depends heavily on some other computer (its server) to fulfill its computational roles. This is different from the traditional fat client, which is a fully equipped computer designed to perform all its functionalities by itself. The specific roles assumed by the server may vary, from providing data persistence (for example, for diskless nodes) to actual information processing on the client's behalf.

Thin clients occur as components of a broader computer infrastructure, where many thin clients connect to a server through a network or a cloud, and share their computations and other functionalities with the same server. In a small scale deployment, 10 to 20 thin clients can be networked and connected to a server. In this case, the thin clients can be managed in a stand alone mode. However, in a large scale deployment, 50 to 100 thin clients can also be networked together to form a large thin client network. However, it would be difficult to manage all these thin clients in a stand alone mode. It is necessary to manage the large number of thin clients in a managed mode. Therefore, it is desirable to have a centralized thin client management software at the server that can provision, configure, control and manage all these thin clients connected to the server.

Therefore, an unaddressed need exists in the art to address the aforementioned deficiencies and inadequacies.

SUMMARY

In one aspect, the present disclosure relates to a desktop cloud manager configured to manage a number of thin client computers. In certain embodiments, the desktop cloud manager includes: (a) an XMS server processor; (b) an XMS communication interface configured to communicate with a thin client agent for each of the thin client computers through a network, (c) a thin client computer database, and (d) a non-volatile memory. The non-volatile memory stores an XMS server operating system, firmware of the desktop cloud manager, and thin client management software. When the thin client management software is executed by the XMS server processor, the thin client management software is configured to connect to the plurality of thin client computers through the network, discover the plurality of thin client computers, register the plurality of thin client computers at the thin client computer database, detect a management mode of each of the plurality of thin client computers, provision functionalities of each of the plurality of thin client computers according to the management mode, configure device settings of peripherals attached to the plurality of thin client computers, and manage and control the plurality of thin client computers.

In certain embodiments, the thin client computer database contains detail information of the thin client computers. The information includes network passcode, connection parameters, unique device ID, MAC addresses, peripheral devices, functions provisioned, privileges, remote resources, and event logs of the thin client computers. In certain embodiments, the network is a cloud network, an internet, an intranet, a local area network (LAN), a wide area network (WAN), a wireless communication network, and a Wi-Fi network.

In certain embodiments, the thin client computer database further comprises user information, privilege information and inventory information of the plurality of thin client computers.

In certain embodiments, the management mode of each of the plurality of thin client computers is a local managed mode or a remote managed mode. The thin client computer in the local managed mode is not managed by the desktop cloud manager and a user of the thin client computer will be asked to change factory default password, and to configure device settings of all peripherals attached to the thin client computer. The thin client computer in the remote managed mode is managed by the desktop cloud manager and password, the authorized users, and all device settings of the peripherals attached to the thin client computer are received by a thin client agent from the desktop cloud manager.

In certain embodiments, the thin client management software, when executed at the XMS server processor, is configured to discover the plurality of thin client computers using proprietary protocols or universal plug and play (UPnP) protocol.

In certain embodiments, the peripherals attached to the thin client computers include one or more of following devices: audio recording device, audio playback device, audio storage device, video recording device, video display device, video storage device, image recording device, image display device, image storage device, CD/DVD-read device, CD/DVD-read and write device, printer device, webcam device, Voice over IP (VOIP) device, scanner device, network controller device, keyboard, mouse, joystick, external hard drive, network hub and switch, touchscreen, video projector, serial port, parallel port; and USB port.

In certain embodiments, the desktop cloud manager is configured to provision the peripherals attached to the plurality of thin client computers and their related functions, and to store information of the peripherals attached to the plurality of thin client computers and their related functions in the thin client computer database.

In certain embodiments, the thin client management software is configured to manage and control the plurality of thin client computers by: managing and controlling operations of the plurality of thin client computers; and managing and controlling operations of the peripherals attached to the plurality of thin client computers. In certain embodiments, the managing and controlling the operations of the plurality of thin client computers operation includes: monitoring the operation of the plurality of thin client computers; checking the authorized users against the thin client computer database; checking the authorized thin client computers against the thin client computer database; locking out any unauthorized thin client computers; and disallowing any unauthorized users to use the plurality of thin client computers. In certain embodiments, the managing and controlling the operations of the peripherals attached to the plurality of thin client computers operation includes: enabling each of authorized peripherals attached to the plurality of thin client computers; making each of authorized peripherals functions available to the user of a thin client computer to use; disabling each of unauthorized peripherals attached to the plurality of thin client computers; and disallowing any unauthorized peripheral functions to be performed by the user of the thin client computer.

In certain embodiments, each of the thin client computers has (a) a thin client agent, (b) a thin client user interface, and (c) a thin client database. The thin client agent of each of the thin client computers is configured to discover one or more desktop cloud managers, communicate with one or more desktop cloud managers, allow the desktop cloud manager to discover the thin client computer, select by the user of thin client computer a desktop cloud manager from a list of discovered desktop cloud managers, register the thin client computer to the selected desktop cloud managers, provide thin client computer information to the selected desktop cloud manager, and provide remote control ability to the selected desktop cloud manager.

In another aspect, the present disclosure relates to a computer-implemented method for a desktop cloud manager to manage and control thin client computers. The method includes: connecting to the plurality of thin client computers through a network; discovering the plurality of thin client computers using proprietary protocols or UPnP protocol; registering the plurality of thin client computers at a thin client computer database; detecting a management mode of each of the plurality of thin client computers; provisioning functionalities of each of the plurality of thin client computers according to the management mode; configuring device settings of peripherals attached to the plurality of thin client computers; and managing and controlling the plurality of thin client computers.

In certain embodiments, the desktop cloud manager includes: (a) an XMS server processor, (b) an XMS communication interface configured to communicate with a thin client agent for each of the thin client computers through the network, (c) a thin client computer database, and (d) a non-volatile memory storing an XMS server operating system, firmware of the desktop cloud manager, and thin client management software.

In certain embodiments, each of the thin client computers includes (a) a thin client agent, (b) a thin client user interface, and (c) a thin client database. The thin client agent of a thin client computer is configured to discover one or more desktop cloud managers, communicate with one or more desktop cloud managers, allow the desktop cloud manager to discover the thin client computer, select a desktop cloud manager from a list of discovered desktop cloud managers, register the thin client computer to the selected desktop cloud managers, provide thin client computer information to the selected desktop cloud manager, and provide remote control ability to the selected desktop cloud manager.

In certain embodiments, the thin client computer database of the desktop cloud manager includes detail information of the thin client computers including, but not limited to, network passcode, connection parameters, unique device ID, MAC addresses, peripheral devices, functions provisioned, privileges, remote resources, and event logs. In certain embodiments, the network is a cloud network, an internet, an intranet, a local area network (LAN), a wide area network (WAN), a wireless communication network, or a Wi-Fi network.

In certain embodiments, the management mode of each of the plurality of thin client computers is a local managed mode or a remote managed mode, wherein the thin client computer in local managed mode is not managed by the desktop cloud manager and a user of the thin client computer will be asked to change factory default password, and to configure device settings, and the thin client computer in remote managed mode is managed by the desktop cloud manager and password, the authorized users, and all device settings are received by the thin client agent from the desktop cloud manager.

In yet another aspect, the present disclosure relates to a non-transitory computer storage medium. The non-transitory computer storage medium stores computer-executable instructions. When the computer-executable instructions are executed by an XMS server processor of a desktop cloud manager, cause the XMS server processor to: connect the desktop cloud manager to the plurality of thin client computers through a cloud; discover the plurality of thin client computers using proprietary protocols or UPnP protocol; register the plurality of thin client computers at a thin client computer database; detect a management mode of each of the plurality of thin client computers; provision functionalities of each of the plurality of thin client computers according to the management mode; configure the device settings of peripherals attached to the plurality of thin client computers; and manage and control the plurality of thin client computers.

In certain embodiments, each of the thin client computers includes (a) a thin client agent, (b) a thin client user interface, and (c) a thin client database. The thin client agent of a thin client computer is configured to discover one or more desktop cloud managers, communicate with one or more desktop cloud managers, allow the desktop cloud manager to discover the thin client computer, select a desktop cloud manager from a list of discovered desktop cloud managers, register the thin client computer to the selected desktop cloud managers, provide thin client computer information to the selected desktop cloud manager, and provide remote control ability to the selected desktop cloud manager.

In certain embodiments, the instructions are configured to manage and control the plurality of thin client computers by: monitoring the operation of the plurality of thin client computers; checking the authorized users against the thin client computer database; checking the authorized thin client computers against the thin client computer database; locking out any unauthorized thin client computers; disallowing any unauthorized users to use the plurality of thin client computers; enabling each of authorized peripherals attached to the plurality of thin client computers; making each of authorized peripherals functions available to the user of a thin client computer to use; disabling each of unauthorized peripherals attached to the plurality of thin client computers; and disallowing any unauthorized peripheral functions to be performed by the user of the thin client computer.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-4. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
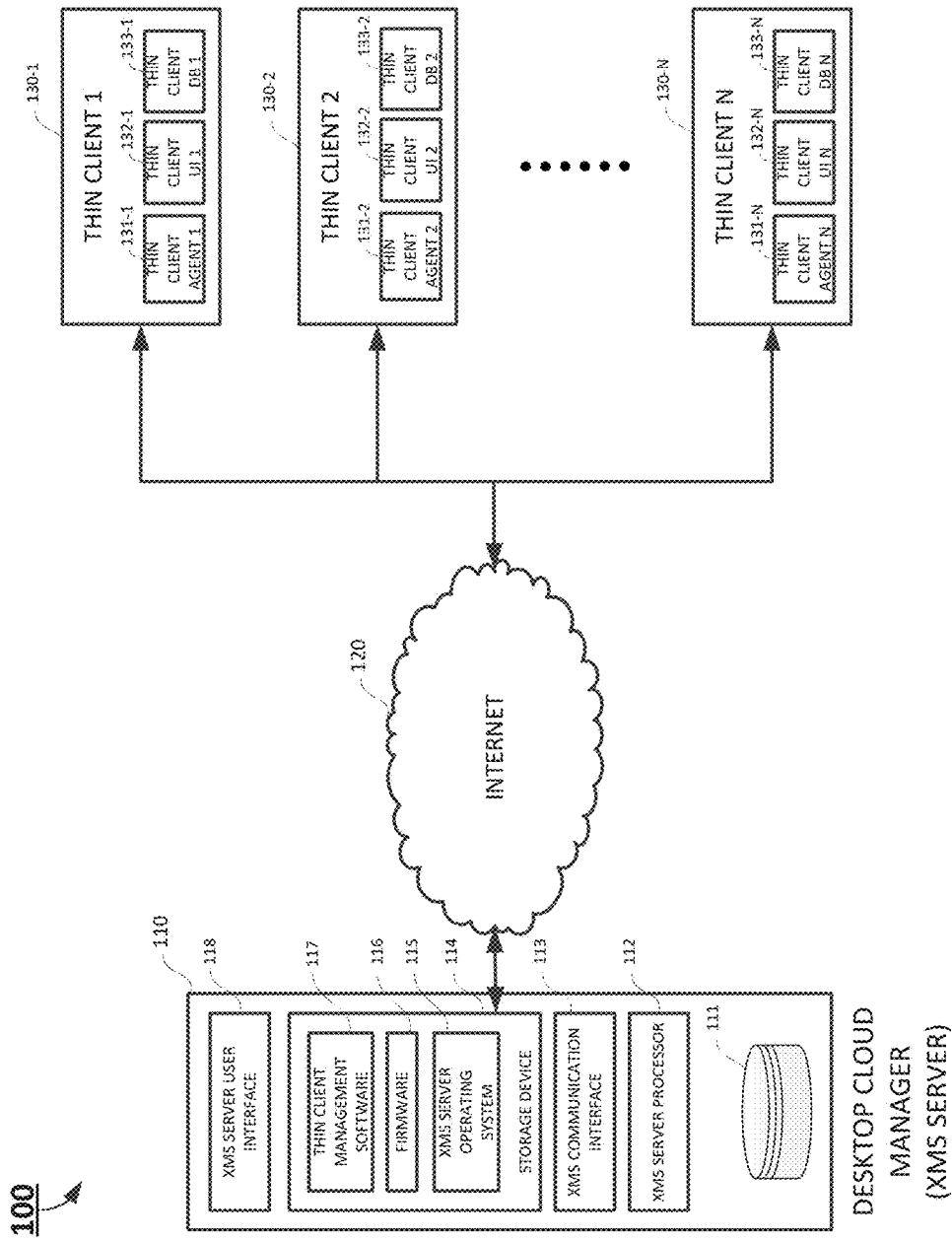
FIG. 1 shows architectural view of a desktop cloud manager and thin client computers connected to the desktop cloud manager through a cloud according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-4, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

In one aspect, the present disclosure relates to a thin client computer desktop cloud management system. FIG. 1 shows architectural view of a thin client computer desktop cloud management system 100 according to certain embodiments of the present disclosure. In one embodiment, the thin client computer desktop cloud management system 100 includes at least one desktop cloud manager 110, a cloud 120, and N thin client computers 130-1, 130-2, . . . , and 130-N.

The desktop cloud manager 110 is an eXtensible Management System (XMS) server. The XMS server 110 may be a computing device, such as a general purpose computer. Generally, the XMS server 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the XMS server 110 include, but not limited to, a thin client computer database 111, an XMS server processor 112, an XMS communication interface 113, a storage device 114, and other required Input/Output (I/O) modules (not shown). In certain embodiments, the XMS communication interface 113 may be physical hardware interface such as electrical connectors, buses, ports, cables, terminals, or other I/O devices. The XMS communication interface 113 is used to facilitate the communication between the XMS server 110 and all thin client computers 130-1, 130-2, . . . , 130-N through the cloud 120. The communication between the thin client computers 130-I, and the XMS server 110 is secured through authentication and encryption mechanism.

In certain embodiments, each of the thin client computer 130-I, I=1, 2, . . . , N includes at least a thin client agent 131-I, a thin client user interface 132-I and a thin client database 133-I. The thin client agent 131-I is used to control and manage the thin client computer 130-I either in local managed mode, or remote managed mode. When the thin client agent 131-I is operating in local managed mode, it operates the thin client computer 130-I independently. When the thin client agent 131-I is operating in remote managed mode, it operates the thin client computer 130-I according to the configuration, control commands, and management instructions from the XMS server 110. The thin client user interface 132-I facilitates the user to control and manage the thin client computer 130-I either locally, or remotely. Each of the thin client databases 133-I stores the management mode of the thin client computer 130-I and the configuration of its peripherals.

Further, the XMS server 110 includes a storage device 114, which stores various software applications, including an XMS server operating system (OS) 115, and XMS server firmware 116, and a thin client management software 117. In certain embodiments, the storage device 114 is a non-volatile memory such as read-only memory (ROM), flash memory, secure digital (SD) memory, ferroelectric RAM (F-RAM), and optical discs. Most types of magnetic computer storage devices such as hard disks, floppy disks, and magnetic tape, are ferroelectric RAM type storage devices. In certain embodiments, the XMS server 110 may include at least one user input/output device (not shown in FIG. 1) and an XMS server user interface 118 for a user to generate controlling input and output signals of the XMS server 110. Examples of the I/O device include keyboards, touch pads, mouse, microphones, display screens, touch screens, or other I/O devices applicable for the XMS server 110. Some I/O devices, such as touch screens, are provided for the dual input/output purposes.

In certain embodiments, the XMS server processor 112 is configured to control operation of the XMS server 110. The XMS server processor 112 executes the XMS server operating system 115 and other applications on the XMS server 110. The XMS server operating system 115 can be collective management software managing the operation of the XMS server 110. For example, the XMS server operating system 115 can include a set of functional programs that control and manage operations of the devices connected to the XMS server 110. The set of application programs provide certain utility software for the user to manage the XMS server 110. In certain embodiments, the XMS server operating system 115 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, the XMS server 110 may include other services or programs. For example, the XMS server 110 may be configured to generate a report of the operations of XMS server 110 and the devices connected to the XMS server 110. In certain embodiments, the XMS server 110 may include a virtual network computing (VNC) client, which may communicate to a VNC server running on at least one of the thin client computers 130-I to mirror the window of the thin client computers 130-I, such that an administrator of the XMS server 110 may check the operations of the thin client computers 130-I for administration, debug or other purposes.

In certain embodiments, the thin client management software 117 is used by a user to manage and control the thin client computers 130-I, I=1, 2, . . . , N through the cloud 120. When the thin client management software 117 is executed by the XMS server processor 112, the thin client management software 117 performs one or more of following operations:

(a) connecting the XMS server 110 to the thin client computers 130-I through the cloud 120;
(b) discovering the thin client computers 130-I;
(c) registering the thin client computers 130-I at the thin client computer database 111;
(d) detecting management modes of the thin client computers 130-I;
(e) provisioning functionalities of the thin client computers 130-I according to the management modes detected;
(f) configuring the device settings of peripherals attached to the thin client computers 130-I; and
(g) managing and controlling the thin client computers 130-I.

In certain embodiments, the thin client management software 117 may discover the thin client computers 130-I using proprietary protocols, such as an Advanced Adaptive Video Compression Algorithm (AAVICA) compression and redirection KVM engine, or universal plug and play (UPnP) protocol.

In certain embodiments, the managing and controlling of the thin client computers 130-I includes power management and control. For example, the thin client management software 117 may control one or more of the thin client computers 130-I to perform shutdown, reset, power on or wake-on-LAN processes.

In certain embodiments, the thin client computers 130-I are low-cost, centrally-managed computers devoid of CD-ROM players, diskette drives, and expansion slots, computers or computer programs which depend heavily on some other computer (the XMS server 110) to fulfill their computational or data processing roles, and share their computations and other functionalities with the same server. This is different from the traditional fat client, which is a fully equipped computer designed to perform all its functionalities by itself. The specific roles assumed by the server may vary, from providing data persistence (for example, for diskless nodes) to actual information processing on the client's behalf.

In certain embodiments, depending on the role of each thin client computer 130-I, the thin client computer 130-I may include certain peripherals. Examples of the peripherals include: audio recording device, audio playback device, audio storage device, video recording device, video display device, video storage device, image recording device, image display device, image storage device, CD/DVD-read device, CD/DVD-read and write device, printer device, webcam device, Voice over IP (VOIP) device, scanner device, network controller device, keyboard, mouse, joystick external hard drive, network hub and switch, touchscreen, video projector, serial port, parallel port; and USB port.

Generally, the thin client computers are managed and controlled in two basic modes: (a) local managed mode, and (b) remote managed mode. When a thin client computer 130-I is operated by a user in local managed mode, the XMS server 110 does not provide any control over the thin client computer 130-I other than provide computational and data processing support and share resources with the thin client computer 130-I. Each thin client computer is operated alone locally, has its own password and individual settings of all peripherals attached to the thin client computer. On the other hand, when a thin client computer is operated by a user in remote managed mode, the XMS server 110 controls the operation of the thin client computer 130-I. All thin client computers 130-I are registered with the XMS server 110, and all thin client computers 130-I as well as peripherals attached to the thin client computers 130-I are provisioned, all passwords, the list of authorized users and their configuration parameters are received by a thin client agent 131-I residing in the thin client computer 130-I from the XMS server 110.

In certain embodiments, the thin client computer database 111 includes detail information of the thin client computers 130-I. The information includes at least one or more of the network passcodes, network connection parameters, unique device ID, MAC addresses, peripheral devices, functionalities the thin client computer are provisioned, privileges, remote resources, and event logs. The cloud can be the internet, an intranet, a local area network (LAN), a wide area network (WAN), a wireless communication network, and a Wi-Fi network.

In certain embodiments, the thin client computer database 111 also serves as a user database to store user information, privilege information and inventory information of thin client computers 130-I. Thus, an administrator of the XMS server 110 may configure the user database to change the user information to create or delete users, or to change the privileged information to assign privileges. In certain embodiments, the administrator may use the thin client management software 117 to change the inventory information to manage thin client computer inventory by adding or deleting a thin client computer 130-I.

In certain embodiments, the thin client agent 131-I of the thin client computer 130-I is configured to perform one or more of following operations:

(a) discovering one or more desktop cloud managers
(b) communicating with one or more desktop cloud managers;
(c) allowing the desktop cloud manager to discover the thin client computer;
(d) registering the thin client computer to one of the desktop cloud managers;
(e) configuring the peripherals attached to the thin client computer;
(f) managing the peripherals attached to the thin client computer;
(g) monitoring the status of the thin client computer and its peripherals;
(h) performing actions on the thin client computer locally at the direction of the desktop cloud manager;
(i) providing thin client computer information to the desktop cloud manager; and
(j) providing the remote control ability to the desktop cloud manager.

In certain embodiments, a thin client computer 130-I can connect to more than one desktop cloud managers or XMS servers 110 and also communicate with multiple XMS servers 110. When a user operates a thin client computer 130-I, he/she can choose to manage the thin client computer 130-I either in local managed mode or remote managed mode.

When the thin client computer 130-I is operated in local managed mode, the user must setup the thin client computer 130-I locally. The setup includes the usernames of authorized users who have access to the thin client computer, the password for each of the authorized users, configuring all peripherals attached to the thin client computer 130-I and all functions the thin client computer can perform.

When the thin client computer 130-I is operated in remote managed mode, the the thin client computer 130-I receives the thin client computer settings, the associated peripherals settings, the usernames of authorized users who have access to the thin client computer, the password for each of the authorized users from the XMS server 110 through the thin client agent 131-I. The thin client computer 130-I is operated, monitored, managed, and controlled by the XMS server 110. When the thin client computer 130-I is connected to one or more of the XMS servers 110 through the cloud 120, the XMS server 110 will be able to discover all thin client computers 130-I connected to the cloud 120 and the XMS server 110 using proprietary protocols or UPnP protocol. When the thin client computer 130-I is operated under remote managed mode, the user of the thin client will need to select one of the XMS servers to register and establish server and client relationship.

In one embodiment, when the thin client computer 130-I is operated in local managed mode, the thin client agent 131-I configures, manages and controls all peripherals attached to the thin client computer 130-I locally. The thin client agent 131-I monitors the status of the thin client computer and its peripherals, and performing actions on the thin client computer locally.

In another embodiment, when the thin client computer 130-I is operated in remote managed mode, the thin client agent 131-I configures, manages and controls all peripherals attached to the thin client computer 130-I according to the control parameters received from the XMS server 110. The thin client agent 131-I monitors the status of the thin client computer and its peripherals, and performing actions on the thin client computer locally at the direction of the XMS server 110. The thin client agent 131-I also transmits thin client computer information to the XMS server 110; and provides remote control ability to the XMS server 110.

Figure 2:
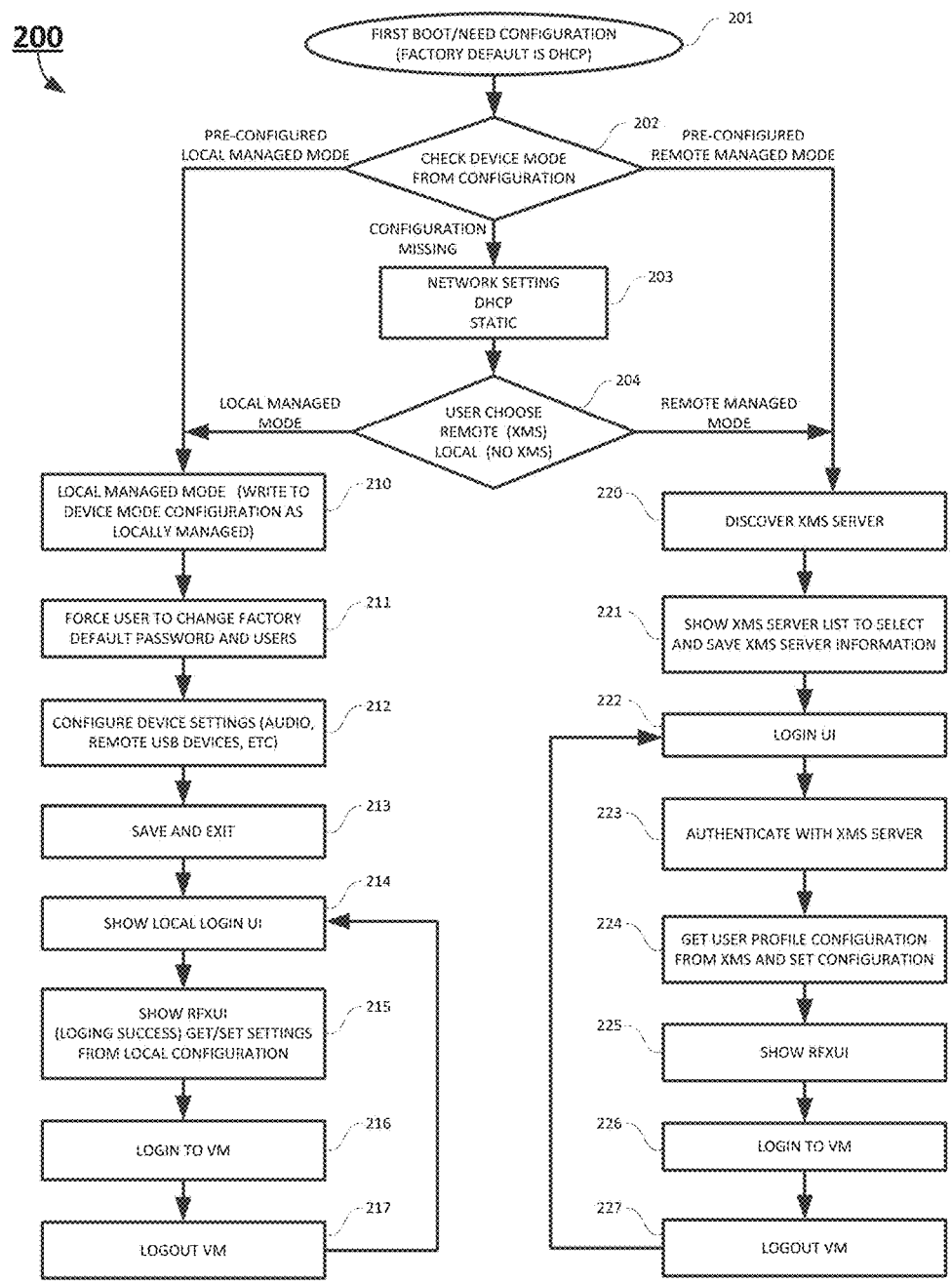
FIG. 2 shows a flow chart of a thin client agent of a thin client computer working with a desktop cloud manager according to certain embodiments of the present disclosure.

FIG. 2 shows a flow chart 200 of the interaction between a thin client agent 131-I of a thin client computer 130-I and an XMS server 110 according to certain embodiments of the present disclosure. When an XMS server 110 is connected to multiple thin client computers 130-I through a cloud 120 the first time, the XMS server 110 and these thin client computers 130-I will discover each other through proprietary protocols or UPnP protocol. In one embodiment, at least one of the thin client computers 130-I is pre-configured to operate in a local managed mode. In another embodiment, at least one of the thin client computers 130-I is pre-configured to operate in a remote managed mode. In a further embodiment, at least one of the thin client computers 130-I is not pre-configured to operate either in the local managed mode or in the remote managed mode. Therefore, as soon as thin client computer desktop cloud management system 100 is connected and booted up at operation 201, a local thin client agent 131-I will proceeds to query operation 202 to check the mode of the operation of the thin client computer 130-I. If the thin client computer is pre-configured to operate in the local managed mode, the operation proceeds to operation 210. If the thin client computer is pre-configured to operate in the remote managed mode, the operation proceeds to operation 220. If the thin client computer is not pre-configured to operate either in the local managed mode or in the remote managed mode, the operation proceeds to operation 203 for network setting. The network setting follows two different protocols: (a) Dynamic Host Configuration Protocol (DHCP) that dynamically configure the IP address, and (b) static network setting that. In one embodiment, the IP address of the thin client computer is dynamically and automatically assigned according to DHCP protocol. In another embodiment, the IP address of the thin client computer is statically assigned according to certain IP address table. When the IP address of the thin client computer is assigned and the thin client discovered one or more XMS servers, the user of the thin client computer has to make a choice at operation 204. There are two modes of operation at this stage: (a) local managed mode that does not require an XMS server, and (b) remote managed mode that requires at least one XMS server. If the user chooses (a), the process continues to operation 210. If the user chooses (b), the process continues to operation 220.

If the thin client computer 130-I is configured to operate in local managed mode, the process continue to operation 210. At operation 210, the device mode configuration is written that the thin client computer 130-I will be operating in local managed mode.

At operation 211, the thin client agent 131-I of the thin client computer 130-I displays a user interface 132-I on a console of the thin client computer 130-I, and forces the user to change factory default password, so that the thin client computer 130-I can be operated without the control and management of the XMS server 110. In certain embodiments, the authorized user name and their corresponding passwords can also be set up at this time.

At operation 212, the user of the thin client computer 130-I configures all peripherals available on the thin client computers according to a specific configuration designed for this thin client computer 130-I.

At operation 213, the thin client computer configuration and thin client computer peripheral configuration are saved in the thin client database 133-I locally so the thin client computer 130-I will be operated according to these configurations.

At operation 214, the thin client agent 131-I of the thin client computer 130-I displays on the thin client user interface 132-I a local login user interface allowing the authorized user to log in locally.

At operation 215, after the user log in, the thin client agent 131-I of the thin client computer 130-I displays a RFX user interface, gets the peripheral configuration from the local thin client database 133-I, and configures the peripherals of the thin client computer 130-I according to the peripheral configuration.

At operation 216, the user of the thin client computer 130-I logs in a virtual machine to perform the functions of the thin client computer 130-I.

At operation 217, the user of the thin client computer 130-I logs out the virtual machine after the functions of the thin client computer 130-I are performed. The process returns back to operation 214 to display a local login user interface and wait for user to log in again.

If the thin client computer 130-I is configured to operate in remote managed mode, the process continue to operation 220. At operation 220, the thin client agent 132-I sends UPnP broadcasts to locate one or more XMS servers 110 connected to the cloud 120 and the thin client computer 130-I.

At operation 221, the thin client agent 131-I of the thin client computer 130-I displays a list of the XMS servers 110 the thin client agent 131-I discovered for the user to select. The user selects one of the XMS servers 110 to be the manager of the thin client computer 130-I. The XMS server 110 selected is saved in the thin client database 133-I locally and also registered at the XMS server 110 selected.

At operation 222, the thin client agent 131-I of the thin client computer 130-I displays a login user interface at the thin client user interface 132-I to allow a user of the thin client computer 130-I to log in.

At operation 223, the thin client agent 131-I of the thin client computer 130-I sends inquiry to the selected XMS server 110 to authenticate the user of the thin client computer 130-I with the selected XMS server 110.

At operation 224, the thin client agent 131-I of the thin client computer 130-I retrieves the user profile, thin client computer configuration and thin client computer peripherals configuration from the thin client computer database 111 of the XMS server 110, and configures the thin client computer 130-I and its peripherals according to the configurations retrieved.

At operation 225, the thin client agent 131-I of the thin client computer 130-I displays a RFX user interface to the user to log in.

At operation 226, the user of the thin client computer 130-I logs in a virtual machine to perform the functions of the thin client computer 130-I.

At operation 227, the user of the thin client computer 130-I logs out the virtual machine after the functions of the thin client computer 130-I are performed. The process returns back to operation 222 to display a local login user interface and wait for user to log in again.

Figure 3:
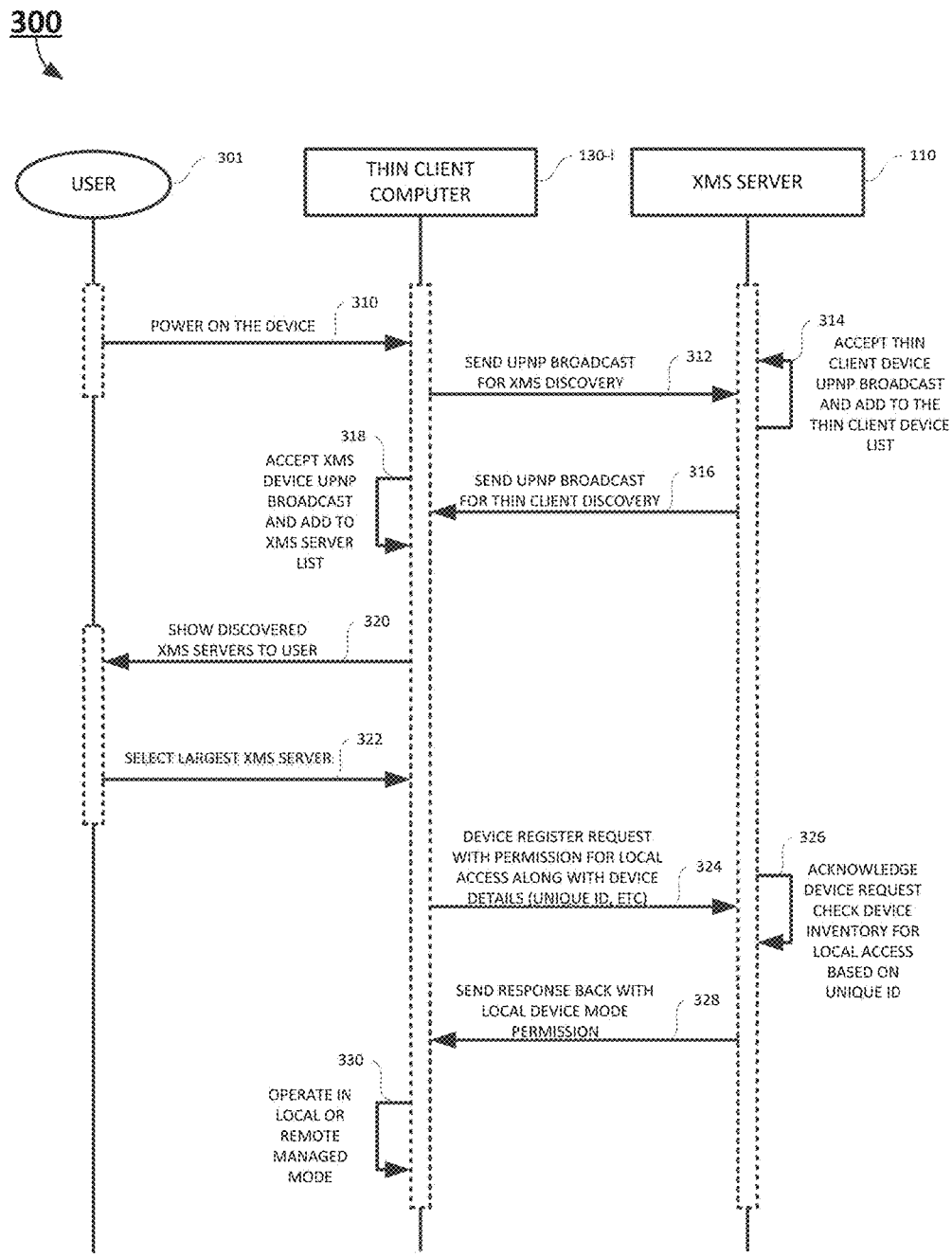
FIG. 3 shows a process that the desktop cloud manager initially discovers and registers the thin client agent of the thin client computer according to certain embodiments of the present disclosure.

FIG. 3 shows a process 300 that the XMS server 110 initially discovers and registers the thin client computer 130-I according to certain embodiments of the present disclosure.

At operation 310, a user 301 powers on a thin client computer 130-I.

Once the thin client computer 130-I is fully booted up, at operation 312, the thin client agent 131-I of the thin client computer 130-I sends UPnP broadcast through the cloud 120 to discover the XMS servers 110 that are connected through the cloud 120. In certain embodiments, the thin client computer 130-I may use period checks, such as UPnP M-SEARCH, to discover if any of the XMS servers 110 is present on the network.

At operation 314, one or more XMS servers 110 connected to the thin client computer 130-I receive the thin client agent 132-I UPnP broadcast, and adds the thin client computer to its thin client computer list. In certain embodiments, when the thin client computer 130-I may use period checks, such as UPnP M-SEARCH, to discover the XMS servers 110, the XMS server 110 which receives the UPnP broadcast will automatically detect the thin client computer 130-I bi-directionally.

At operation 316, the XMS servers 110 also send out UPnP broadcast for the thin client computer 130-I to discover. In certain embodiments, for each of the XMS servers 110, as soon as the XMS server 110 is present on the network, the XMS server 110 sends out the UPnP broadcast to notify the thin client computers 130-I. In certain embodiments, the UPnP broadcast contains XMS related strings to the subnets.

At operation 318, the thin client agent 132-I receives the UPnP broadcasts from all XMS servers 110 and adds all XMS servers 110 to a XMS server list locally in the thin client database 133-I. In certain embodiments, when a received UPnP broadcast contains XMS related strings to the subnets, the thin client agent 132-I adds the corresponding XMS server 110 to the XMS server list by adding the XMS IP address to the XMS server list.

At operation 320, the thin client agent 132-I display the list of XMS servers 110 to the thin client user interface 132-I for the user 301 of the thin client computer 130-I to select which XMS server 110 to register.

At operation 322, the user 301 of the thin client computer 130-I selects one of the XMS servers 110. In one embodiment, the user 301 selects the largest XMS server 110 from the XMS server list.

At operation 324, the thin client agent 131-I of the thin client computer 130-I sends thin client computer register request with permission for local access along with thin client computer detail such as unique device ID to the selected XMS server 110.

At operation 326, the selected XMS server 110 acknowledges the thin client computer register request, and check the XMS server 110's thin client computer inventory to see if the thin client computer 130-I is allowed local access according to the thin client computer database 111, and decides the management mode of the thin client computer 130-I.

At operation 328, the XMS server 110 sends the response back to the thin client computer 130-I in response to the thin client computer register request to inform the thin client agent 131-I the management mode the thin client computer 130-I.

At operation 330, the thin client computer 130-I is operated either in local managed mode or remote managed mode according to the control commands received from the selected XMS server 110.

It should be appreciated that the thin client computer 130-I and the XMS server 110 may locate on the same subnet. In certain embodiments, the thin client computer 130-I and the XMS server 110 may locate on different subnet once router supports multicast routing.

In certain embodiments, the managing and controlling the thin client computers operation includes one or more of these operations: (a) managing and controlling the operations of the plurality of thin client computers, and (b) managing and controlling the operation of the peripherals attached to the plurality of thin client computers.

The managing and controlling the operations of the thin client computers includes one or more of following operations:

(a) monitoring operations of the thin client computers;
(b) checking the authorized users against the thin client computer database;
(c) checking the authorized thin client computers against the thin client computer database;
(d) locking out any unauthorized thin client computers; and
(e) disallowing any unauthorized users to use the plurality of thin client computers.

Figure 4:
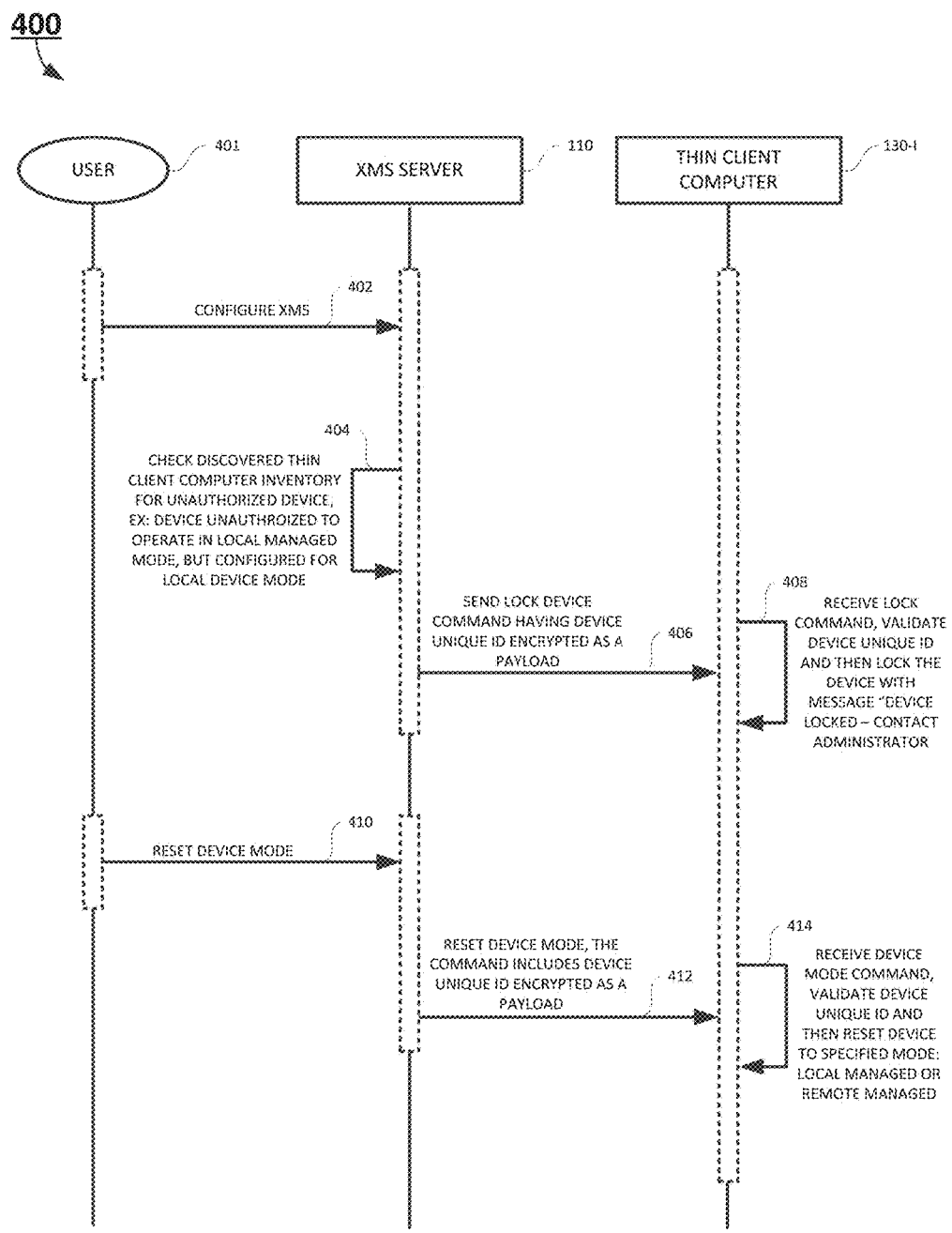
FIG. 4 shows command communication process between the desktop cloud manager and the thin client agent of the thin client computer according to certain embodiments of the present disclosure.

FIG. 4 shows command communication process 400 between the XMS server 110 and the thin client agent 131-I of the thin client computer 130-I according to certain embodiments of the present disclosure.

At operation 402, a user 401 of the XMS server 110 uses the XMS server user interface 118 to configure the XMS server 110.

At operation 404, the thin client management software 117 OF THE XMS server 110 checks the thin client computers 130-I discovered and stored in the thin client computer database 111 of the XMS server 110 to all thin client attached to the XMS server 110 are operated properly according to their configurations. For example, when a thin client computer 130-I is provisioned to operate in remote managed mode, however, it is configured locally by the user 301 of the thin client computer 130-I to operate in local managed mode. This thin client computer 130-I is considered as an unauthorized thin client computer. This thin client computer 130-I will be flagged as an unauthorized thin client computer.

At operation 406, the thin client management software 117 of the selected XMS server 110 sends a lock device command to lock up the thin client computer to prevent unauthorized use of the thin client computer 130-I. The lock device command includes at least the thin client computer's unique device ID to identify the unauthorized thin client computer 130-I. In certain embodiments, the unique device ID of the thin client computer 130-I is encrypted and passed to the thin client computer 130-I as payload of the lock device command.

At operation 408, the thin client agent 131-I receives the load device command from the XMS server 110, check against the unique device ID. If the unique device ID received matches the unique device ID of the thin client computer 130-I, then the thin client agent 131-I of the thin client computer 130-I will display a message at the thin client user interface 132-I indicating "This thin client computer is locked. Contact your system administrator", and disable all functions of the thin client computer 130-I as well as all its peripherals.

After the user 301 of the thin client computer 130-I contact the system administrator or the user 401 of the XMS server 110, at operation 410, the user 401 of the XMS server 110 may want to reset the thin client computer management mode. If so, the user 401 of the XMS server 110 can perform a control function on the XMS server user interface 118 to issue a reset device command to reset the management mode of the thin client computer 130-I.

At operation 412, the thin client management software 117 of the XMS server 110 sends the reset device command to the thin client agent 132-I of the thin client computer 130-I. In certain embodiments, the unique device ID of the thin client computer 130-I is encrypted and passed to the thin client computer 130-I as payload of the reset device command.

At operation 414, the thin client agent 132-I of the thin client computer 130-I receives the reset device command along with the unique device ID of the thin client computer 130-I. If the unique device ID received matches the unique device ID of the thin client computer 130-I, the thin client agent 132-I of the thin client computer 130-I will unlock the thin client computer 130-I according to the reset device command, configure the thin client computer 130-I and its peripherals, and assign a management mode. Then the thin client computer 130-I will be operated in either local managed mode or remote managed mode.

In certain embodiments, the managing and controlling the operation of the peripherals attached to the thin client computers operation includes one or more of these operations:
   (a) enabling each of authorized peripherals attached to the thin client computers;
   (b) making each of authorized peripherals functions available to the user of the thin client computer to use;
   (c) disabling each of unauthorized peripherals attached to the thin client computers; and
   (d) disallowing any unauthorized peripheral functions to be performed by the user of the thin client computer.

In another aspect, the present disclosure relates to a computer-implemented method for a desktop cloud manager to manage and control thin client computers. The method includes one or more of following operations:
   (a) connecting to the thin client computers through a cloud;
   (b) discovering the thin client computers using UPnP protocol;
   (c) registering the thin client computers at a thin client computer database;
   (d) detecting management modes of the thin client computers;
   (e) provisioning functionalities of the thin client computers according to the management modes;
   (f) configuring the device settings of peripherals attached to the thin client computers; and
   (g) managing and controlling the thin client computers.

In certain embodiments, the desktop cloud manager includes: (a) an XMS server processor, (b) an XMS communication interface configured to communicate with a thin client agent for each of the thin client computers through the cloud, (c) a thin client computer database, and (d) a non-volatile memory storing an XMS server operating system, firmware of the desktop cloud manager, and thin client management software.

In certain embodiments, each of the thin client computers includes (a) a thin client agent, (b) a thin client user interface, and (c) a thin client database. The thin client agent of a thin client computer is configured to perform one or more of following operations:
   (a) discovering one or more desktop cloud managers;
   (b) communicating with one or more desktop cloud managers;
   (c) allowing the desktop cloud manager to discover the thin client computer;
   (d) registering the thin client computer to one of the desktop cloud managers;
   (e) providing thin client computer information to the desktop cloud manager; and
   (f) providing the remote control ability to the desktop cloud manager.

In certain embodiments, the thin client computer database of the desktop cloud manager includes detail information of the thin client computers including, but not limited to, network passcode, connection parameters, unique device ID, MAC addresses, peripheral devices, functions provisioned, privileges, remote resources, and event logs.

In certain embodiments, the management modes comprise local managed mode and remote managed mode, wherein the thin client computer in local managed mode is not managed by the desktop cloud manager and a user of the thin client computer will be asked to change factory default password, and to configure device settings, and the thin client computer in remote managed mode is managed by the desktop cloud manager and password, the authorized users, and all device settings are received by the thin client agent from the desktop cloud manager.

In yet another aspect, the present disclosure relates to a non-transitory computer storage medium. The non-transitory computer storage medium stores computer-executable instructions. When the computer-executable instructions are executed by an XMS server processor of a desktop cloud manager, cause the XMS server processor to perform one or more of following operations to manage and control a number of thin client computers:
   (a) connecting the desktop cloud manager to the thin client computers through a cloud;
   (b) discovering the thin client computers using UPnP protocol;
   (c) registering the thin client computers at a thin client computer database;
   (d) detecting management modes of the thin client computers;

(e) provisioning functionalities of the thin client computers according to the management modes;
(f) configuring the device settings of peripherals attached to the thin client computers; and
(g) managing and controlling the thin client computers.

In certain embodiments, each of the thin client computers includes (a) a thin client agent, (b) a thin client user interface, and (c) a thin client database. The thin client agent of a thin client computer is configured to perform one or more of following operations:
(a) discovering one or more desktop cloud managers;
(b) communicating with one or more desktop cloud managers;
(c) allowing the desktop cloud manager to discover the thin client computer;
(d) registering the thin client computer to one of the desktop cloud managers;
(e) providing thin client computer information to the desktop cloud manager; and
(f) providing the remote control ability to the desktop cloud manager.

In certain embodiments, the managing and controlling the thin client computers operation includes one or more of following operations:
(a) monitoring the operation of the thin client computers;
(b) checking the authorized users against the thin client computer database;
(c) checking the authorized thin client computers against the thin client computer database;
(d) locking out any unauthorized thin client computers;
(e) disallowing any unauthorized users to use the thin client computers.
(f) enabling each of authorized peripherals attached to the thin client computers;
(g) making each of authorized peripherals functions available to the user of a thin client computer to use;
(h) disabling each of unauthorized peripherals attached to the thin client computers; and
(i) disallowing any unauthorized peripheral functions to be performed by the user of the thin client computer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A desktop cloud manager configured to manage and control a plurality of thin client computers, comprising:
an eXtensible Management System (XMS) server processor;
an XMS communication interface configured to communicate with a thin client agent for each of the plurality of thin client computers through a network;
a thin client computer database; and
a non-volatile memory storing an XMS server operating system, firmware of the desktop cloud manager, and thin client management software, wherein the thin client management software, when executed at the XMS server processor, is configured to:
connect to the plurality of thin client computers through the network,
discover the plurality of thin client computers,
register the plurality of thin client computers at the thin client computer database,
detect a management mode of each of the plurality of thin client computers, wherein the management mode is switchable between a local managed mode and a remote managed mode,
provision functionalities of each of the plurality of thin client computers according to the management mode being switched to one of the local managed mode and the remote managed mode,
configure device settings of peripherals attached to the plurality of thin client computers, and
manage and control the plurality of thin client computers;
wherein for each of the plurality of thin client computers,
when the management mode of the thin client computer is switched to the remote managed mode, the desktop cloud manager controls all operation of the thin client computer, and all device settings of the peripherals attached to the plurality of thin client computers are received by a thin client agent of the thin client computer from the desktop cloud manager; and
when the management mode of the thin client computer is switched to the local managed mode, the desktop cloud manager only provides computational and data processing support to the thin client computer and shares resources with the thin client computer, and does not provide any other control over the thin client computer, and device settings of the peripherals attached to the thin client computer are configured based on input of a user at the thin client computer,
wherein the management mode of the thin client computer is first determined by a device mode from a boot/need configuration of the desktop cloud manager, and is then determined by a user selection; and
wherein the local management mode and the remote management mode of the thin client computer can be reset to each other with a reset device command from the thin client management software of the XMS server along with a unique device ID as a payload of the reset device command when the unique device ID matches a unique device ID of the thin client computer.

2. The desktop cloud manager of claim 1, wherein the thin client computer database comprises detail information of the plurality of thin client computers, including network passcode, connection parameters, the unique device ID, MAC addresses, peripheral devices, functions provisioned, privileges, remote resources, and event logs of the thin client computers.

3. The desktop cloud manager of claim 2, wherein the thin client computer database further comprises user information, privilege information and inventory information of the plurality of thin client computers.

4. The desktop cloud manager of claim 1, wherein the network is a cloud network, an internet, an intranet, a local area network (LAN), a wide area network (WAN), a wireless communication network, or a Wi-Fi network.

5. The desktop cloud manager of claim 1, wherein
when the thin client computer is in the local managed mode, the thin client computer is not managed by the desktop cloud manager and factory default password is changed based on input of the user at the thin client computer, and
when the thin client computer is in the remote managed mode, the thin client computer is managed by the desktop cloud manager, and password and list of authorized users are received by the thin client agent of the thin client computer from the desktop cloud manager.

6. The desktop cloud manager of claim 1, wherein the thin client management software, when executed at the XMS server processor, is configured to discover the plurality of thin client computers using proprietary protocols or universal plug and play (UPnP) protocol.

7. The desktop cloud manager of claim 1, wherein the peripherals attached to the plurality of thin client computers comprise one or more of: an audio recording device, an audio playback device, an audio storage device, a video recording device, a video display device, a video storage device, an image recording device, an image display device, an image storage device, a CD/DVD-read device, a CD/DVD-read and write device, a printer device, a webcam device, a Voice over IP (VOIP) device, a scanner device, a network controller device, a keyboard, a mouse, a joystick, an external hard drive, a network hub and switch, a touchscreen, a video projector, a serial port, a parallel port, and a USB port.

8. The desktop cloud manager of claim 7, wherein the desktop cloud manager is configured to provision the peripherals attached to the plurality of thin client computers and their related functions, and to store information of the peripherals attached to the plurality of thin client computers and their related functions in the thin client computer database.

9. The desktop cloud manager of claim 1, wherein the thin client management software is configured to manage and control the plurality of thin client computers by:
managing and controlling operations of the plurality of thin client computers; and
managing and controlling operations of the peripherals attached to the plurality of thin client computers.

10. The desktop cloud manager of claim 9, wherein the managing and controlling the operations of the plurality of thin client computers operation comprises:
monitoring the operation of the plurality of thin client computers;
checking the authorized users against the thin client computer database;
checking the authorized thin client computers against the thin client computer database;
locking out any unauthorized thin client computers; and
disallowing any unauthorized users to use the plurality of thin client computers.

11. The desktop cloud manager of claim 9, wherein the managing and controlling the operations of the peripherals attached to the plurality of thin client computers operation comprises:
enabling each of authorized peripherals attached to the plurality of thin client computers;
making each of authorized peripherals functions available to the user of a thin client computer to use;
disabling each of unauthorized peripherals attached to the plurality of thin client computers; and
disallowing any unauthorized peripheral functions to be performed by the user of the thin client computer.

12. The desktop cloud manager of claim 1, wherein each of the thin client computers comprises (a) the thin client agent, (b) a thin client user interface, and (c) a thin client database, and wherein the thin client agent of each of the thin client computers is configured to:
discover one or more desktop cloud managers,
communicate with one or more desktop cloud managers,
allow the desktop cloud manager to discover the thin client computer,
select by the user of thin client computer a desktop cloud manager from a list of discovered desktop cloud managers,
register the thin client computer to the selected desktop cloud managers,
provide thin client computer information to the selected desktop cloud manager, and
provide remote control ability to the selected desktop cloud manager.

13. A computer-implemented method for a desktop cloud manager configured to manage a plurality of thin client computers, comprising:
connecting to the plurality of thin client computers through a network;
discovering the plurality of thin client computers using proprietary protocols or universal plug and play (UPnP) protocol;
registering the plurality of thin client computers at a thin client computer database;
detecting a management mode of each of the plurality of thin client computers, wherein the management mode is switchable between a local managed mode and a remote managed mode;
provisioning functionalities of each of the plurality of thin client computers according to the management mode being switched to one of the local managed mode and the remote managed mode;
configuring device settings of peripherals attached to the plurality of thin client computers; and
managing and controlling the plurality of thin client computers;
wherein for each of the plurality of thin client computers,
when the management mode of the thin client computer is switched to the remote managed mode, the desktop cloud manager controls all operation of the thin client computer, and all device settings of the peripherals attached to the plurality of thin client computers are received by a thin client agent of the thin client computer from the desktop cloud manager; and
when the management mode of the thin client computer is switched to the local managed mode, the desktop cloud manager only provides computational and data processing support to the thin client computer and shares resources with the thin client computer, and does not provide any control over the thin client computer, and device settings of the peripherals attached to the thin client computer are configured based on input of a user at the thin client computer,
wherein the management mode of the thin client computer is first determined by a device mode from a boot/need configuration of the desktop cloud manager, and is then determined by a user selection; and
wherein the local management mode and the remote management mode of the thin client computer can be reset to each other with a reset device command from thin client management software of the XMS server along with a unique device ID as a payload of the reset device command when the unique device ID matches a unique device ID of the thin client computer.

14. The computer-implemented method of claim 13, wherein the desktop cloud manager comprises:
an eXtensible Management System (XMS) server processor;
an XMS communication interface configured to communicate with the thin client agent for each of the plurality of thin client computers through the network;
the thin client computer database; and
a non-volatile memory storing an XMS server operating system, firmware of the desktop cloud manager, and the thin client management software.

15. The computer-implemented method of claim 14, wherein each of the thin client computers comprises (a) the thin client agent, (b) a thin client user interface, and (c) a thin client database, wherein the thin client agent of each of the thin client computers is configured to:
discover one or more desktop cloud managers,
communicate with one or more desktop cloud managers,
allow the desktop cloud manager to discover the thin client computer,
select a desktop cloud manager from a list of discovered desktop cloud managers,
register the thin client computer to the selected desktop cloud managers,
provide thin client computer information to the selected desktop cloud manager, and
provide remote control ability to the selected desktop cloud manager.

16. The computer-implemented method of claim 14, wherein the thin client computer database comprises detail information of the plurality of thin client computers, including network passcode, connection parameters, the unique device ID, MAC addresses, peripheral devices, functions provisioned, privileges, remote resources, and event logs.

17. The computer-implemented method of claim 13, wherein the network is a cloud network, an internet, an intranet, a local area network (LAN), a wide area network (WAN), a wireless communication network, or a Wi-Fi network.

18. The computer-implemented method of claim 13, wherein the thin client computer in local managed mode is not managed by the desktop cloud manager and factory default password is changed based on input of the user at the thin client computer, and the thin client computer in remote managed mode is managed by the desktop cloud manager, and password and the authorized users are received by the thin client agent from the desktop cloud manager.

19. The computer-implemented method of claim 18, wherein the desktop cloud manager is configured to provision the peripherals attached to the plurality of thin client computers and their related functions, and to store information of the peripherals attached to the plurality of thin client computers and their related functions in the thin client computer database.

20. The computer-implemented method of claim 13, wherein the managing and controlling the plurality of thin client computers comprises:
managing and controlling the operations of the plurality of thin client computers; and
managing and controlling the operation of the peripherals attached to the plurality of thin client computers.

21. The computer-implemented method of claim 20, wherein the managing and controlling the operations of the plurality of thin client computers operation comprises:
monitoring the operation of the plurality of thin client computers;
checking the authorized users against the thin client computer database;
checking the authorized thin client computers against the thin client computer database;
locking out any unauthorized thin client computers; and
disallowing any unauthorized users to use the plurality of thin client computers.

22. The computer-implemented method of claim 20, wherein the managing and controlling the operation of the peripherals attached to the plurality of thin client computers operation comprises:
enabling each of authorized peripherals attached to the plurality of thin client computers;
making each of authorized peripherals functions available to the user of a thin client computer to use;
disabling each of unauthorized peripherals attached to the plurality of thin client computers; and
disallowing any unauthorized peripheral functions to be performed by the user of the thin client computer.

23. A non-transitory computer storage medium having computer-executable instructions stored thereon which, when executed by an eXtensible Management System (XMS) server processor of a desktop cloud manager, cause the XMS server processor to:
connect the desktop cloud manager to the plurality of thin client computers through a cloud,
discover the plurality of thin client computers using proprietary protocols or universal plug and play (UPnP) protocol,
register the plurality of thin client computers at a thin client computer database,
detect a management mode of each of the plurality of thin client computers, wherein the management mode is switchable between a local managed mode and a remote managed mode,
provision functionalities of each of the plurality of thin client computers according to the management mode being switched to one of the local managed mode and the remote managed mode,
configure the device settings of peripherals attached to the plurality of thin client computers, and
manage and control the plurality of thin client computers;
wherein for each of the plurality of thin client computers,
when the management mode of the thin client computer is switched to the remote managed mode, the desktop cloud manager controls all operation of the thin client computer, and all device settings of the peripherals attached to the plurality of thin client computers are received by a thin client agent of the thin client computer from the desktop cloud manager; and
when the management mode of the thin client computer is switched to the local managed mode, the desktop cloud manager only provides computational and data processing support to the thin client computer and shares resources with the thin client computer, and does not provide any other control over the thin client computer, and device settings of the peripherals attached to the thin client computer are configured based on input of a user at the thin client computer,
wherein the management mode of the thin client computer is first determined by a device mode from a boot/need configuration of the desktop cloud manager, and is then determined by a user selection; and wherein the local management mode and the remote management mode of the thin client computer can be reset to each other with a reset device command from thin client management software of the XMS server along with a unique device ID as a payload of the reset device command when the unique device ID matches a unique device ID of the thin client computer.

24. The non-transitory computer storage medium of claim 23, wherein each of the thin client computers comprises (a) the thin client agent, (b) a thin client user interface, and (c) a thin client database, wherein the thin client agent of each of the thin client computers is configured to:
discover one or more desktop cloud managers,
communicate with one or more desktop cloud managers,
allow the desktop cloud manager to discover the thin client computer,
select a desktop cloud manager from a list of discovered desktop cloud managers,
register the thin client computer to the selected desktop cloud managers,
provide thin client computer information to the selected desktop cloud manager, and
provide remote control ability to the selected desktop cloud manager.

25. The non-transitory computer storage medium of claim 23, wherein the instructions are configured to manage and control the plurality of thin client computers by:
monitoring the operation of the plurality of thin client computers;
checking the authorized users against the thin client computer database;
checking the authorized thin client computers against the thin client computer database;
locking out any unauthorized thin client computers;
disallowing any unauthorized users to use the plurality of thin client computers;
enabling each of authorized peripherals attached to the plurality of thin client computers;
making each of authorized peripherals functions available to the user of a thin client computer to use;
disabling each of unauthorized peripherals attached to the plurality of thin client computers; and
disallowing any unauthorized peripheral functions to be performed by the user of the thin client computer.

* * * * *